Jan. 2, 1968        R. L. WEBER        3,361,052
COFFEE MAKER
Filed Nov. 15, 1965        2 Sheets-Sheet 2
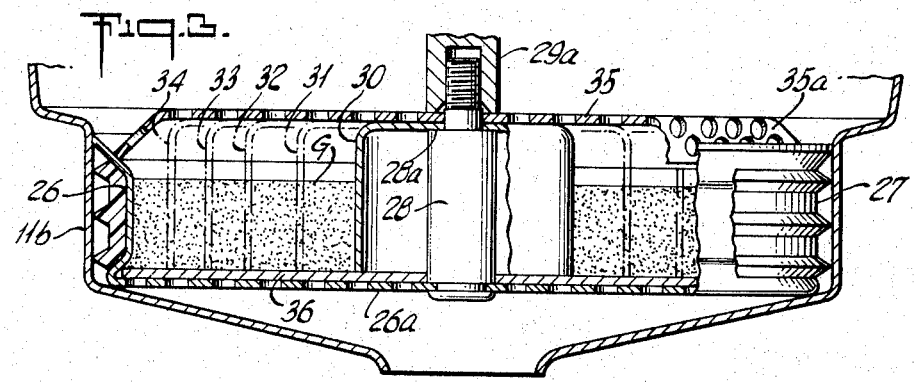
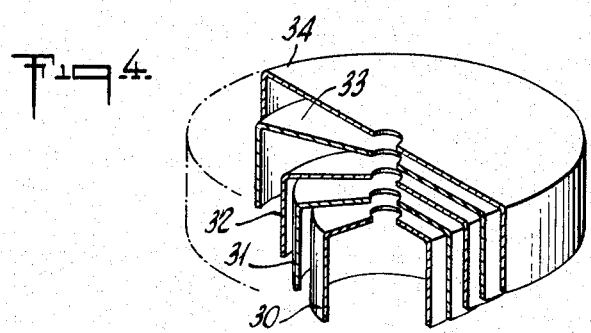
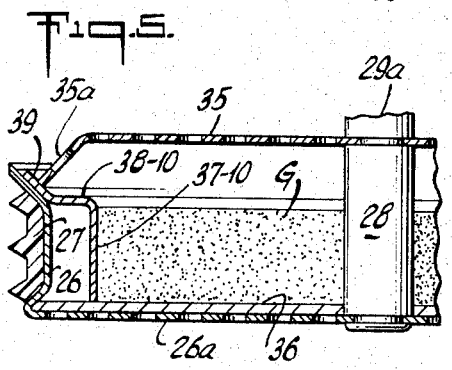
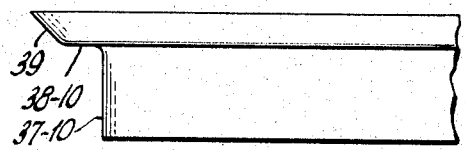
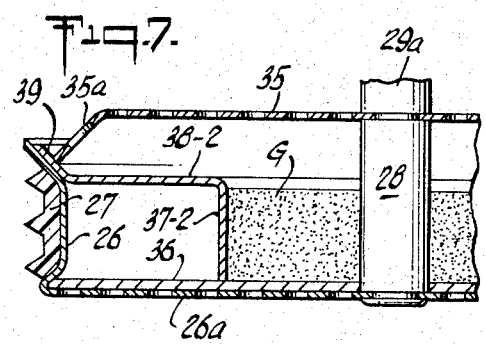
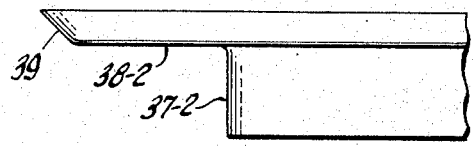
INVENTOR
R. L. WEBER
BY
Hopgood & Calimafde
ATTORNEYS

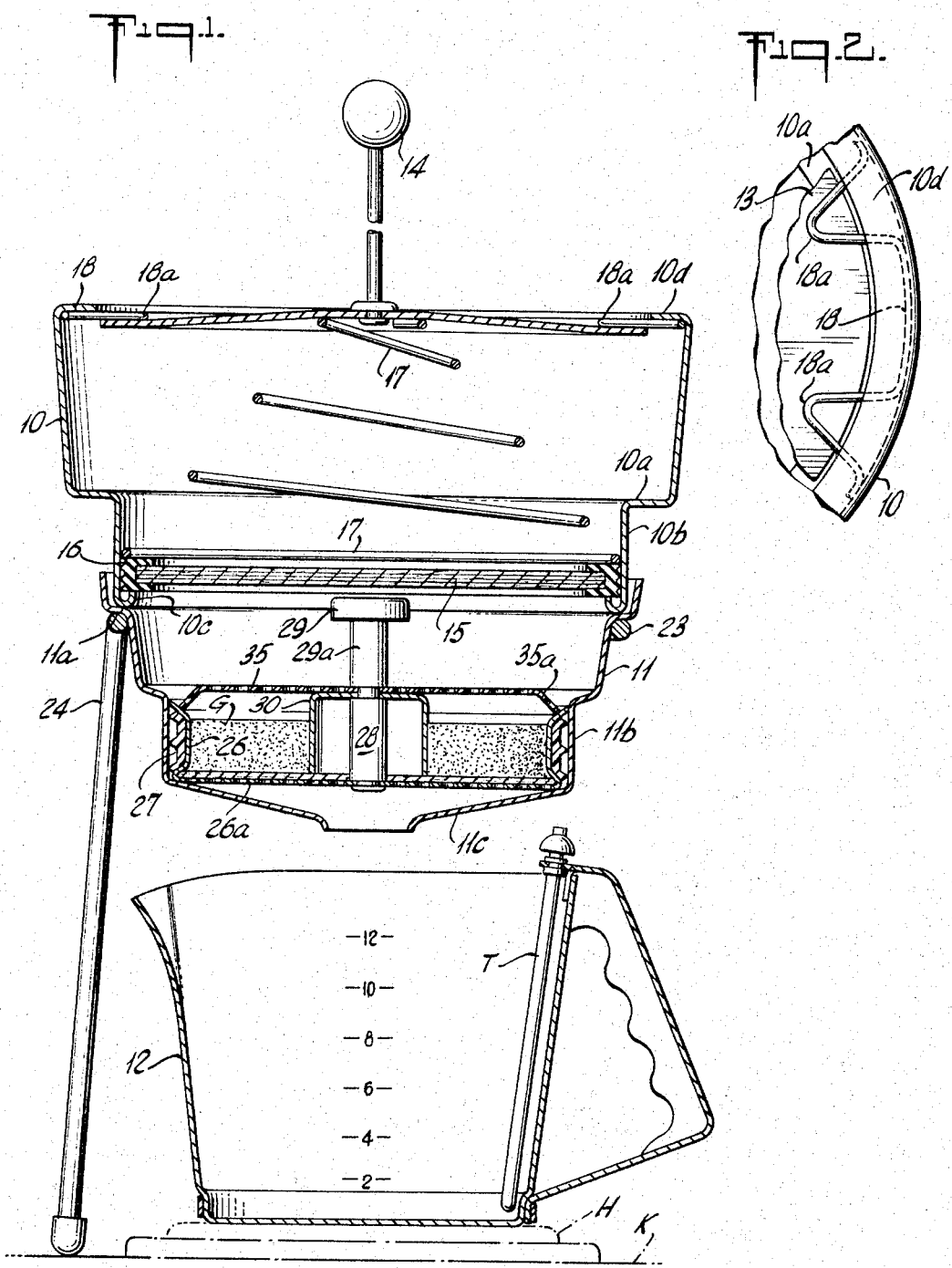

United States Patent Office 3,361,052
Patented Jan. 2, 1968

3,361,052
COFFEE MAKER
Robert L. Weber, 49 Clapboard Hill Road,
New Canaan, Conn. 06840
Filed Nov. 15, 1965, Ser. No. 507,839
9 Claims. (Cl. 99—299)

ABSTRACT OF THE DISCLOSURE

A coffee maker is provided for brewing a variable quantity of coffee in a single brewing run by employing one of various sizes of capacity adapters which fit into the coffee-holding basket so as to provide a predetermined area into which the coffee is placed. The size of the adapter employed is determined by the amount of coffee to be brewed. Thus, the depth of the coffee bed is maintained constant, while the width of the bed is increased or decreased depending upon the size of the adapter employed.

---

This invention relates to beverage makers for making a beverage by filtration of liquid through coffee grounds, tea, or other brew stock. More particularly, the invention is directed to improvements in a coffee maker in which make-up water from a hot water reservoir is passed through ground coffee in a brew chamber to a brew collector.

The invention provides, for the brew chamber of a beverage maker, a novel insertable basket for holding the brew stock, particularly ground coffee. The base of the basket is adapted to support a flat paper filter disc and the bottom corner of the basket frame or cage is angled outwardly to nest the margin of the filter paper and prevent lifting or curling of its edge. A perforated cover of the basket confines the coffee grounds therein and is formed and supported so that it is a sufficient distance above the level of the coffee grounds when dry to allow for swelling of the grounds when wetted, so that the wetted grounds will not be compacted to retard filtration of liquid therethrough. The invention also provides, for a coffee maker, a ground coffee container or basket adapted for predetermined variation of ground coffee holding capacity.

It is desired to provide a coffee maker capable of making various volumes of brew by filtering hot water through proportionate amounts of ground coffee while maintaining a given concentration or strength of the brew regardless of its volume. All other factors, including grade and density of ground coffee, being constant, the strength of the brew depends on the depth of the coffee grounds through which the make-up water is filtered. Accordingly, the invention provides for predetermined variation of the ground coffee container space in the brew chamber at a constant depth, so that different measured or scaled amounts of ground coffee in the brew chamber will have the same depth but will vary in horizontal spread. More particularly, a plurality of capacity adapters are interchangeably settable in a container, which may be the brew chamber itself or a separate container insertable in the brew chamber, for respectively establishing various ground coffee holding spaces differing in cross-sectional area but having the same depth. In one embodiment, which may be taken as the preferred one, the adapters are spacers, each to define the inner wall of a different size annular ground coffee compartment. In another embodiment, the adapters comprise annular shells serving as the outer bounding walls of ground coffee compartments.

In another aspect of the invention, it is concerned with a drip type coffee maker wherein make-up water from the hot water reservoir flows by gravity into the brew chamber and the filtrate drips from the brew chamber into a collector vessel. It is accepted that to make good coffee, the make-up water should be in the temperature range of 190 to 200 degrees Fahrenheit. I contemplate the use of a brew collector vessel which can also serve as a vessel in which the make-up water is heated to desired temperature, the vessel being provided with a temperature indicator which is also useful to show the temperature of the brew when the vessel is serving as the brew receptacle. In order that the heated make-up water may be poured from the vessel into the hot water reservoir and the vessel then be shifted to position for catching the brew before it starts dripping from the brew chamber, the invention provides the reservoir with a cover manually depressible from an upper normal position in which it closes the reservoir at the top to a lower position in which it opens the reservoir for reception of water and closes the reservoir outlet. Clearance is provided between the periphery of the cover and the reservoir section above the outlet, so that when the cover is allowed to rise to its upper position, the entered water will flow around the cover into the outlet.

Another consideration in the brewing of good coffee is that the make-up water be purified before it reaches the ground coffee in the brew chamber. For this purpose, the subject coffee maker utilizes a laminar water filter capable of filtering out suspended organic and other materials. The laminar filter is here a round disc provided with a rim binding ring for the layers of the filter, the binding ring being adapted for fluid-tight force fit into a bounding wall bordering the reservoir outlet opening, so that the water filter is across the outlet opening. Preferably, the water filter disc is insertable into the reservoir from above the outlet opening and into rest position on an annular support which is conveniently provided by forming the bottom edge of the reservoir inwardly. When the water filter is in position in the reservoir, the binding ring of the filter serves as a rest for the base of a spring which urges the cover to its upper position. To prevent undesirable sagging of the water filter layers under the weight of water in the reservoir, the ground coffee basket in the brew chamber is provided with a handle which reaches up close to the underside of the filter and props it centrally against sagging.

Other objects and various features of the invention will be pointed out or will occur to those skilled in the art from a reading of the following specification in conjunction with the accompanying drawings. In said drawings, which show for illustrative purposes only, a preferred form and modification of the invention:

FIG. 1 is a vertical sectional view through the preferred form of coffee maker;

FIG. 2 is a fragmentary plan view of the hot water reservoir, its cover, and a retainer clip for the cover;

FIG. 3 is a partly sectioned and partly broken away view of the variable capacity ground coffee container shown in FIG. 1 on a smaller scale;

FIG. 4 is a partly broken away perspective view of a nest of the preferred embodiment of capacity adapters;

FIG. 5 is a fragmentary vertical sectional view through the ground coffee container as fitted with one of the modified capacity adapters;

FIG. 6 is a fragmentary elevation of the adapter shown in FIG. 5;

FIG. 7 is similar to FIG. 5 but shows a different size modified capacity adapter; and FIG. 8 is a fragmentary elevation of the adapter shown in FIG. 7.

The shown coffee maker includes a round-walled hot water reservoir 10, a brew chamber 11 below the reservoir, and a vessel 12 under the brew chamber. The vessel 12 is made of heat resistant material and is adapted for double duty; as a receptacle for the brew issuing from the brew chamber and as a vessel in which the make-up water is heated to desired temperature. Vessel 12 is equipped with a temperature signaling device T for signaling attainment of the required temperature by water being heated. The device T is also useful to show the brew temperature when the vessel is serving as the brew receptacle. As illustrative, the vessel has a 12-cup capacity and has a scale of graduations at 2-cup intervals.

The hot water reservoir 10 has a wider upper section tapering down to a flat shoulder 10a which borders the upper opening of a reduced, cylindrical outlet section 10b. A cover 13 for the reservoir has a normal upper position in which it closes the reservoir at the top and an alternative depressed position in which it sits on the shoulder 10a and closes the outlet section 10b, the reservoir then being open to receive make-up water. The cover will be manually depressed by means of a handle 14 while the make-up water is being poured into the reservoir from the vessel 12 and until the vessel is placed under the brew chamber 11 in time to catch the brew dripping therefrom.

A ring-bound laminar water filtering disc 15 is disposed horizontally across the lower opening of the reservoir outlet 10b. Disc 15 is composed of several layers effective to filter out suspended organic matter and other impurities from the make-up water as the water flows from outlet 10b to the brew chamber 11. The filter layers are peripherally girded by a channeled binding ring 16 which seals the edges of the layers from the water. Binding ring 16 is made of material, such a polypropylene or the like, having sufficient "give" or flexibility to enable the ring to be force-fitted into water-tight engagement with the inner wall of the outlet section 10b of the reservoir. The water filter is insertable from above into the outlet opening and is set with its binding ring 16 resting on the turned-in bottom edge 10c of the reservoir.

After the water filter 15 has been set in position in the reservoir 10, a light coil spring 17 is inserted. The spring 17 is preferably conical and its bottom convolution is dimensioned to rest on the binding ring 16 of the water filter. Following the insertion of the spring 17, the cover 13 is inserted, the upper end of the spring then abutting the under surface of the cover. The cover is retained in the reservoir by a spring-wire retainer 18. Retainer 18 may be a single ring, a split ring if desired, or it may comprise a plurality of ring sections. In any event, the retainer is adapted to be snapped into position directly under the turned-in top lip 10d of the reservoir and is formed with inwardly offset loops 18a to overlap the cover 13. With this arrangement, when the cover is in its upper position, there is an air gap between the cover and the lip 10d which allows the air pressure on the opposite surfaces of the cover to be equalized.

It is evident that the reservoir cover 13 is normally maintained by spring 17 in upper position in which it closes the reservoir at the top. When make-up water is to be poured into the reservoir, the cover is manually depressed, against resistance of spring 17, until the cover seats on the shoulder 10a, thus shutting the outlet 10b. The cover 13 or the shoulder 10a, or both, may be provided along their cooperable surfaces with means to insure a water-tight seal between the cover and the shoulder when they are in engagement. For instance, the margin of the under surface of the cover may be coated with a plastic material of suitable resiliency, or a plastic rubber-like sealing ring may be stretched into place around the rim of the cover.

When the operator stops holding the cover 13 down, the spring 17 slowly pushes the cover up through the water above it, there is sufficient clearance between the cover periphery and the surrounding wall of the reservoir above the outlet section to allow the water to flow around the cover and into the outlet section as the cover returns to its normal, upper position. As illustrative, the reservoir has a 12-cup capacity, to be consistent with the capacity of the vessel 12.

The reservoir 10 is supported by the brew chamber 11. The brew chamber is a round-walled container with an enlarged upper end which freely surrounds the lower end of the reservoir while the bottom edge 10c of the reservoir sits on a shoulder 11a of the brew chamber. Any suitable frame or stand may be used to mount the brew chamber above the brew receptacle 12. As shown, a tripod stand with a ring top 23 and legs 24 is employed. The brew chamber may be slipped into the ring 23 until the shoulder 11a of the brew chamber rests on the ring. Stand 23–24 may be placed on any suitable support surface K, such as a table top or cooking range top. The vessel 12 is shown resting on an element H which may be a hot plate, a stove burner, or an ordinary raised platform.

The brew chamber narrows down from the shoulder 11a to a lower cylindrical pocket 11b directly above the funnel bottom 11c of the brew chamber. Pocket 11b is adapted to be insertably fitted with a ground coffee basket. The basket comprises a cup-like cage 26, which may be made of stainless steel or the like. It has a perforated flat base and a peripheral wall which is cylindrical between outwardly beveled top and bottom ends. A band seal 27, of polypropylene or the like, has a water-tight fit around the cylindrical section of the cage wall and between the outwardly beveled upper and lower ends of this wall, the top and bottom edges of the seal being complementarily beveled, whereby the cage and seal are interlocked against relative vertical or axial shifting. The seal 27 is dimensioned for water-tight force-fit engagement with the surrounding wall of the pocket 11b of the brew chamber 11, and the basket may be inserted into the pocket as far down as permitted by the encounter of the outwardly angled corner of the cage 26 with the funnel bottom 11c of the brew chamber.

Fixed to and rising from the base 26a of the basket cage 26 is an axially located post 28 which has a shoulder 28a above the height of the cage. Above the shoulder, the post is reduced in diameter and is threaded to receive the internally threaded stem 29 of a flat-topped hand knob 29 for the basket. When the basket and the hot water reservoir 10 are in mounted positions, the top of the handle is closely subjacent to the middle of the water filter disc 15 and will serve to prevent undue sagging of the water filter layers.

The ground coffee basket is variable in capacity by means of capacity adapters settable into the basket cage 26. In the form shown in FIGS. 1, 3 and 4, the adapters are cylindrical spacers, a nest of such spacers 30, 31, 32, 33 and 34 being shown in FIG. 4. The spacers are of different diameters and formed with imperforate tops. The top of each spacer has a center hole of a diameter larger than the outside diameter of the threaded upper ends of the post 28 and just large enough to fit around the smooth post portion between the threaded end and the shoulder 28a of the post. The height of each spacer is the same and corresponds to the height of the post shoulder 28a above the post 26a of the basket cage. It is evident that when the basket handle 29–29a is removed, any one of the spacers 30 to 34 may be slipped over the upper end of the post 28 and down into position in which the lower edge of the spacer is on the base 26a of the basket while the border around the center hole p in the spacer top is on the shoulder 28a of the post.

With a spacer 30, 31, 32, 33 or 34 in position in the basket cage 26, it defines the inner wall of an annular ground coffee-receiving compartment, the outer wall of the compartment being defined by the cage wall. When none of the spacers is assembled to the cage, it has its maximum capacity for ground coffee. As illustrative, it is assumed that the coffee maker is to brew a maximum of twelve cups of coffee. Thus, the hot water reservoir 10 will be large enough to receive a corresponding volume of make-up water and the maximum capacity of the cage 26 will be for twelve units of ground coffee, taking each unit as the amount required for one cup of brew. The spacers 30 to 34 are scaled in diameter to vary the capacity of the basket by two units of ground coffee. Thus, with spacer 30 in position, as shown, the capacity of the basket is reduced to ten units, the amount of coffee grounds required for ten cups of coffee. The positions which the other spacers would have in the cage 26 are indicated in dot-dash in FIGS. 1 and 3. If the spacer 31, instead of spacer 30, is set in the cage 26, the basket will have a capacity for the amount of ground coffee required to brew eight cups; and so on, with the largest diameter spacer 34 reducing the capacity of the basket to the amount of ground coffee required for two cups of brew.

In each case, whichever one or none of the spacers 30 to 34 is in the cage 26, the ground coffee G will be measured into the cage to the same level, that is, to a height just below or at the start of the upper flare or funnel mouth of the cage, so that each of the different quantities of ground coffee measured into the basket will be the same. With all other factors constant, the constant depth maintained for each different quantity of ground coffee placed in the basket results in the different volumes of coffee brew having the same desired strength.

A perforated cover 35 is provided for the ground coffee basket. The cover may be slipped over the upper end of post 28 and onto the shoulder 28a or onto the top of any one of the spacers 30 to 34 which may be in the basket cage. The basket handle 29–29a may then be threaded onto the post 28 and tightened to clamp the cover or the cover and an inserted capacity spaced against the shoulder 28a. The shoulder 28a and, hence, the cover 35 is a substantial height above the level to which the dry coffee is placed in the basket. The clearance between the cover proper and the dry coffee grounds in the basket allows for swelling of the grounds when wetted and avoids compacting of the wetted grounds by the cover, so that no undesirable change in filtration time for the brew liquid will occur. In order to completely confine the coffee grounds by the cover, it is formed with a down-sloped rim 35a adapted for tight edge abutment with the upper flare of the cage 26 when the cover is clamped down by the handle 29–29a.

A disc of filter paper 36 may be placed on the flat, perforated base 26a of the cage 26. The outwardly angled bottom corner of the cage wall provides a recess to nest the peripheral margin of the filter paper and prevent its edge from rising or curling.

It is understood, of course, that in preparation for making a required volume of coffee, the reservoir 10 will first be separated from the brew chamber 11. The ground coffee basket will then be lifted out by its handle 29 from the brew chamber. The handle will be unscrewed to allow removal of the basket cover 35 and of any capacity spacer which may be in the basket cage. A filter paper 36 will then be placed in position on the basket floor or hose 26a, after which the required capacity spacer will be set in the cage 26. Coffee grounds will then be poured into the compartment, defined by the capacity spacer and the cage wall, to the level marked by the start of the flared or funnel mouth of the cage. The cover 35 will then be replaced and the handle 29 will be applied and turned to clamp the cover and capacity spacer in place. The basket will then be reinserted into the brew chamber.

FIGS. 5 to 8 show a different embodiment of capacity adapters for the ground coffee basket. In this embodiment, each adapter comprises a cylindrical shell 37 open at both ends and centrally dependent from a generally horizontally disposed circular flange 38 having an outwardly beveled rim 39. The shells of the different adapters vary in diameter according to a predetermined scale of ground coffee units to be contained therein. As illustrative, the shell diameters may be scaled for 2-unit variations in capacity. FIG. 6 indicates adapter for containing ten units of ground coffee, the shell of this adapter being accordingly designated 37–10 and the flange designated 38–10. When this adapter is positioned in the cage 26, as in FIG. 5, the basket capacity is reduced from twelve units to ten units. FIG. 8 indicates the adapter for containing two units of ground coffee and when in the cage 26, as in FIG. 7, the basket capacity is reduced to two units. Three other such adapters with shell diameters scaled for eight, six and four units will be provided. All these modified capacity adapters will have the same shell height and coffee grounds will be measured therein to the same level, just below the top of the shell. The sloped rims 39 of the adapters are alike and when any of these adapters is rested in the cage, its rim 39 will be flush on the flared mouth of the basket cage 26 and the shell of the adapter will be centered in the cage. After the adapter has been inserted in the cage and the coffee grounds measured into the adapter shell, the basket cover 35 will be applied and then clamped down, by the stem 29a of basket handle 29, against the shoulder 38a of the post 38. When the cover is clamped down, the edge of its down-turned lip 35a will press down on the rim 39 of the adapter and lock the adapter in place in the cage 26.

While the invention has been described in detail for the preferred forms shown, it will be understood that modifications may be made within the scope of the invention as defined by the claims which follow.

I claim:

1. In a coffee maker to brew a variable quantity of coffee in a single brewing run by feed of a variable number of chosen units of volume of make-up water from a hot water chamber to a brew chamber for filtration through ground coffee in the brew chamber to a brew collector, the brew chamber being furnished with a filtration-passing base to support ground coffee under a head of the make-up water in the brew chamber, and a plurality of different capacity adapters interchangeably positionable individually on the filtrate-passing base for varying the area of the base exposed to placement thereon of ground coffee, each capacity adapter including a substantially upright bounding wall form for a ground coffee compartment floored by the area of the base exposed by the adapter when on the base, the upright wall forms of the respective capacity adapters being variously dimensioned in girth to determine ground coffee compartments of different capacities in accordance with a scale of ground coffee units proportional to the volume units of make-up water, the filtrate-passing base being the base of a ground coffee holding basket insertable into the brew chamber, centering means associated with the basket for axially centering any one of the different capacity adapters in position on the base with the cylindrical wall form of the adapter concentrically disposed within the periphery of the basket, each of the capacity adapters also having an imperforate top portion for closing off the unused portion of the coffee compartment, and means at the upper end of said centering means for securing the capacity adapter in place.

2. In a coffee maker as in claim 1, wherein the upright wall forms of the respective capacity adapters are cylindrical forms of similar height but different diameters, whereby the ground coffee compartments determined by the different capacity adapters differ in cross-sectional area but have a similar height so as to contain different amounts of ground coffee to the same depth, and wherein a perforated basket cover is provided at the top of said coffee-holding basket.

3. In a coffee maker as in claim 1, the filtrate-passing base being the base of a ground coffee holding basket insertable into the brew chamber and having an annular peripheral wall fitted into an accommodating wall of the brew chamber, each of said capacity adapters having its cylindrical form open at the top and bottom and centrally dependent from a horizontally disposed imperforate annular flange, the outside diameter of the flange of each adapter being alike and such that the flange will have rim support on the upper end of the peripheral wall of the basket when the cylindrical form of the adapter is positioned on the filtrate-passing base, so that the cylindrical form will be in concentric relation within the peripheral wall of the basket and will constitute the outer bounding wall of a ground coffee compartment having a ground coffee containing capacity dependent on the diameter of the cylindrical form.

4. In a coffee maker as in claim 3, an annular perforated cover for the basket for resting at its rim on the upper end of the peripheral wall of the basket or on the rim of the flange of any of the capacity adapters positioned in the basket, and means for clamping the cover and adapter down on the upper end of the peripheral wall of the basket.

5. In a coffee maker as in claim 1, said filtrate-passing base being at the lower end of an upstanding round wall, said wall being outwardly formed at its junction with said base to provide a round recess, the base being flat so as to support a flat filter paper disc with a round perimeter shaped and dimensioned to nest in said round recess when the filter paper disc is on the base, whereby the outer edge of the disc is held down against departure from contact with the base.

6. In a coffee maker as in claim 1, said hot water chamber being above the brew chamber and mounted thereon, so that the make-up water will flow by gravity from the hot water chamber into the brew chamber, and a laminated water filter disc having a binding ring sealing the outer edges of the laminations of the disc against infiltration of water, the binding ring being dimensioned and having sufficient flexibility for water-tight force fitting into a surrounding wall of one of said chambers so as to dispose the laminations of the filter disk across the path of the make-up water before it reaches the ground coffee in the brew chamber.

7. In a coffee maker as in claim 1, the hot water chamber having an outlet above the brew chamber so that make-up water may flow by gravity from the hot water chamber through the outlet into the brew chamber, and a cover for the hot water chamber normally biased to an upper position in which it closes the hot water chamber at the top while the outlet is open, the cover being manually depressible to a lower position in which it closes the outlet while opening the hot water chamber at the top for reception of make-up water, clearance being provided between the periphery of the cover and the section of the hot water chamber above the outlet so that on return of the cover to its normal upper position the entered water will flow around the cover and into the then-opened outlet.

8. In a coffee maker as in claim 7, the hot water chamber having a reduced lower outlet section and a shoulder bordering the upper opening of the outlet section, the cover in depressed position having seating engagement on said shoulder to close the outlet section, a spring contained in the hot water chamber for biasing the cover to its upper position, and means whereby the cover is releasably retained against lifting out of the hot water chamber, said means also serving to establish the upper position of the cover.

9. In a coffee maker as in claim 8, the outlet section of the hot water chamber being annular, a round water filter disc having a rim binding ring for water-tight force fit into the surrounding wall of the outlet section so as to dispose the water filter disc across the opening in the outlet section, the hot water chamber having an annular rest for said binding ring, and said spring being a coil spring with its bottom convolution resting on the binding ring of the water filter disc.

References Cited

UNITED STATES PATENTS

| | | | |
|---|---|---|---|
| 203,179 | 4/1878 | Miller | 99—299 |
| 713,192 | 11/1902 | Aubry | 99—306 |
| 1,553,732 | 9/1925 | Weinberg | 99—306 |

WILLIAM I. PRICE, *Primary Examiner.*